US006857920B2

(12) United States Patent
Marathe et al.

(10) Patent No.: US 6,857,920 B2
(45) Date of Patent: Feb. 22, 2005

(54) VARIABLE VENTURI

(75) Inventors: Bhaskar Marathe, Wooster, OH (US);
Gilles Pesant, Palm Bay, FL (US);
DuSablon Patrice, Palm Bay, FL (US)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/617,354

(22) Filed: Jul. 11, 2003

(65) Prior Publication Data

US 2004/0121663 A1 Jun. 24, 2004

Related U.S. Application Data

(60) Provisional application No. 60/395,010, filed on Jul. 11, 2002.

(51) Int. Cl.[7] .............................................. B63H 11/00
(52) U.S. Cl. ......................................... 440/38; 440/47
(58) Field of Search ..................................... 440/38, 47

(56) References Cited

U.S. PATENT DOCUMENTS

| | | | |
|---|---|---|---|
| 3,279,704 A | * | 10/1966 | Delao et al. ........... 239/265.43 |
| 5,338,234 A | | 8/1994 | Nanami |
| 5,658,176 A | | 8/1997 | Jordan |
| 5,679,035 A | | 10/1997 | Jordan |
| 5,683,276 A | | 11/1997 | Jordan |
| 5,700,170 A | | 12/1997 | Mataya |
| 5,863,229 A | | 1/1999 | Matte |
| 6,293,836 B1 | | 9/2001 | Blanchard |

OTHER PUBLICATIONS www.wetwolf.com, Sep. 23, 2003, pp. 1–6.

* cited by examiner

Primary Examiner—Jesus D. Sotelo
(74) Attorney, Agent, or Firm—BRP Legal Services

(57) ABSTRACT

Variable venturi for use in jet propulsion systems of watercraft include discharge openings with selectively variable discharge areas that enable a venturi controller to selectively maximize top speed, acceleration, and/or fuel efficiency. The variable venturi may include a plurality of circumferentially-spaced, squeezable, flexible sections that selectively move radially inwardly to alter the discharge area. Alternatively, the variable venturi may include a flexible venturi with a variably-shaped flexible discharge opening. Alternatively, the variable venturi may include a main rear discharge opening and a plurality of additional discharge openings with selectively openable valves, whereby selective opening of the valves effectively increases the discharge area. Alternatively, the variable venturi may have a movable end flap that selectively varies the discharge area.

24 Claims, 11 Drawing Sheets

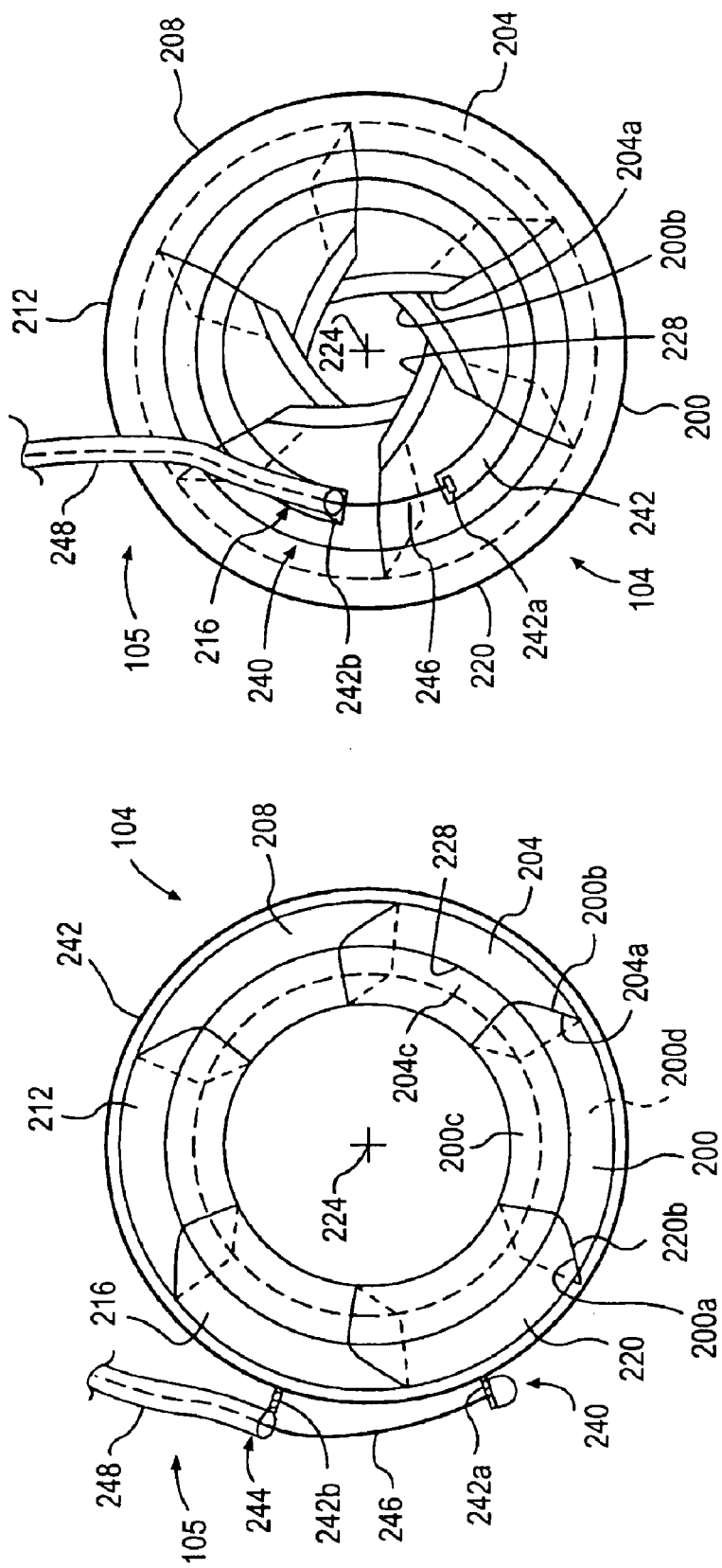

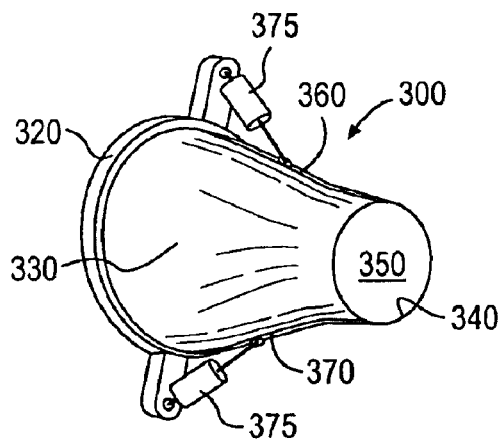
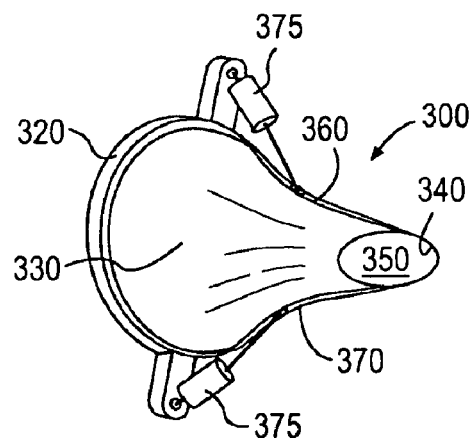
FIG. 7A  FIG. 7C
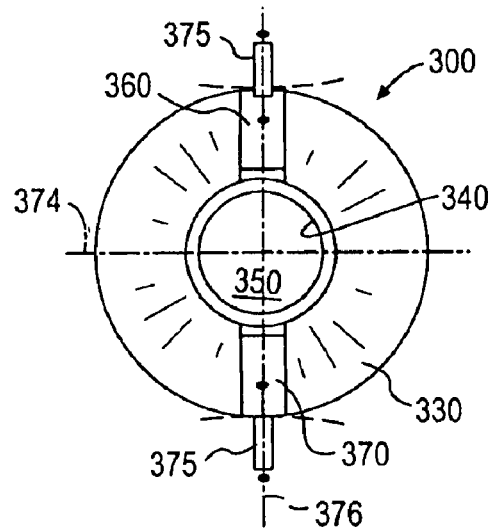
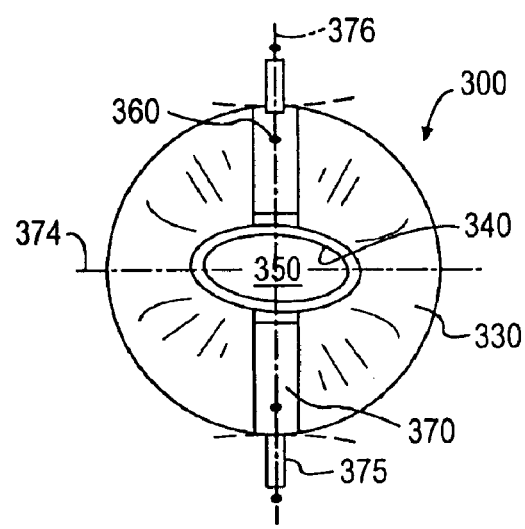
FIG. 7B  FIG. 7D

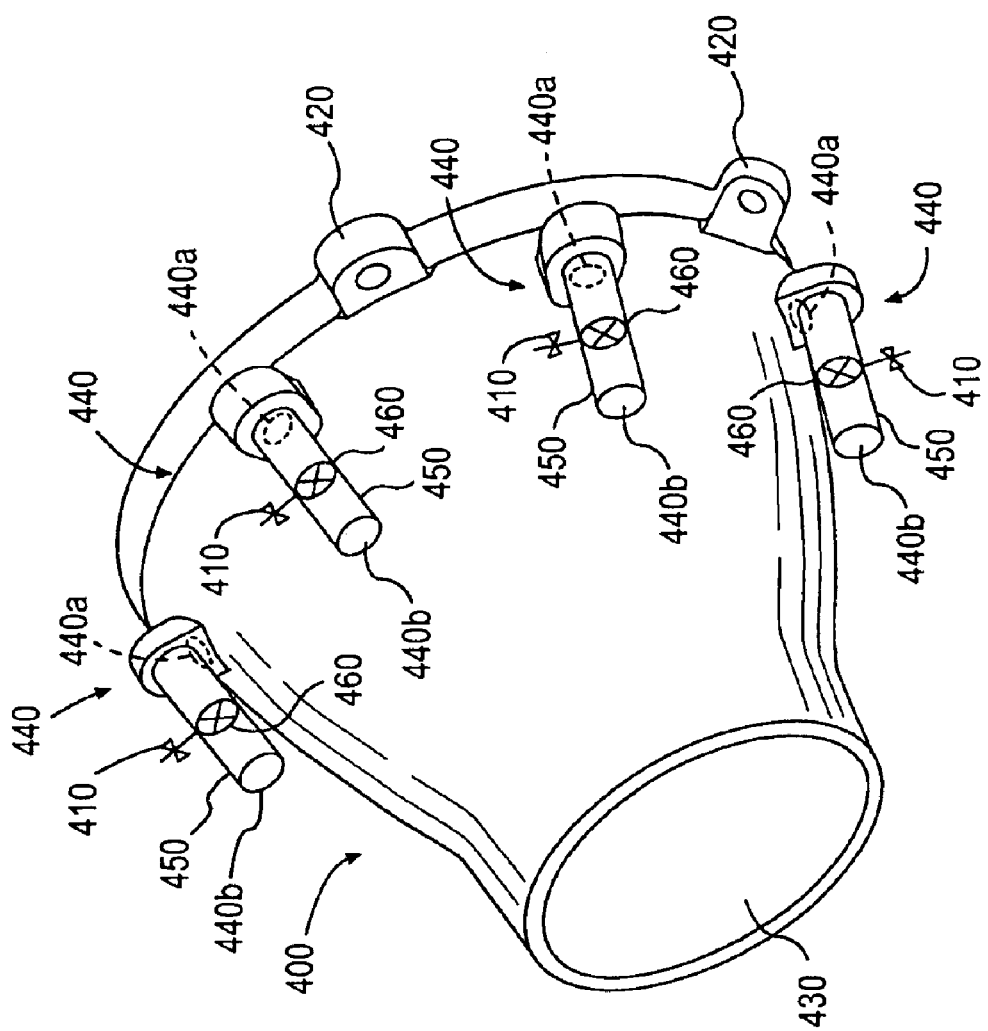

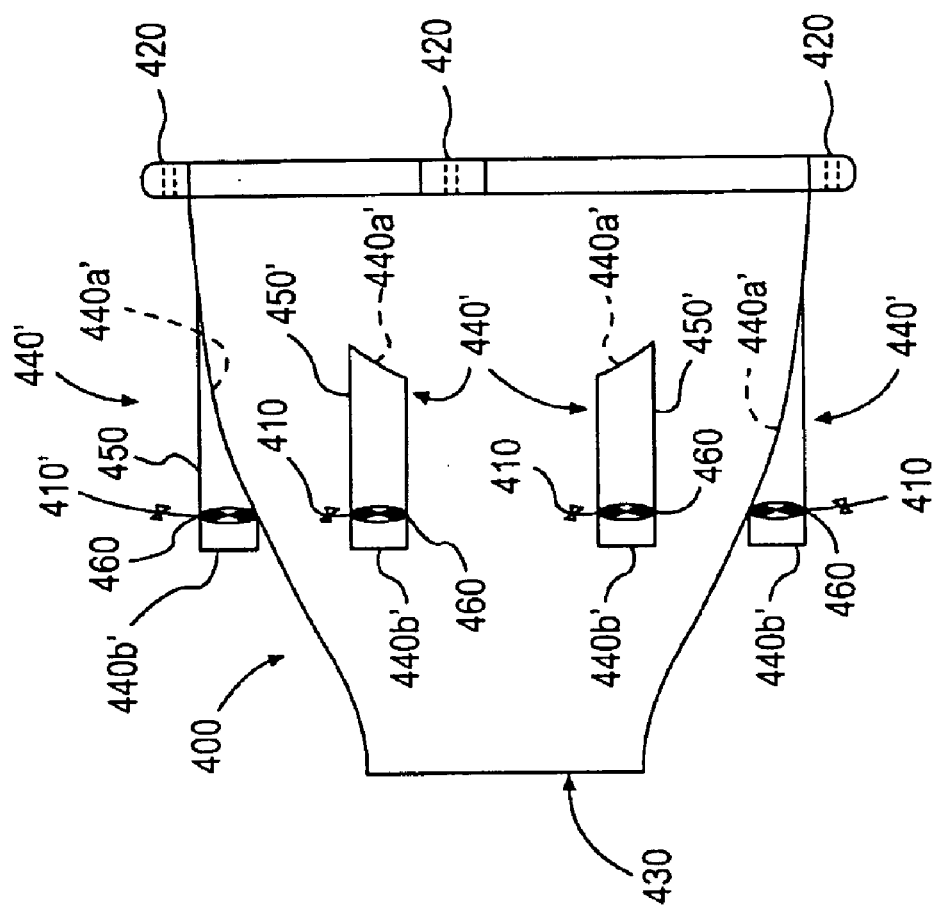

VARIABLE VENTURI

This application claims the benefit of priority to U.S. Provisional Patent Application No. 60/395,010 titled "VARIABLE VENTURI", filed on Jul. 11, 2002, which is incorporated herein by reference.

BACKGROUND OF THE INVENTION

1. Field of the Invention

This invention relates to jet powered watercraft, especially personal watercraft ("PWCs"). More specifically, the invention concerns the jet propulsion system of the watercraft. In particular, the invention is directed to controlling thrust.

2. Description of Related Art

Jet powered watercraft have become very popular in recent years for recreational use and for use as transportation in coastal communities. The jet power offers high performance, which improves acceleration, handling and shallow water operation. Accordingly, PWCs and jet boats, which typically employ jet propulsion, have become common place, especially in resort areas. As use of PWCs and jet boats has increased, operators expect better performance, including greater operational efficiency, higher top speed, faster acceleration, and improved control.

FIG. 12 illustrates a prior art jet propulsion system 600 disposed within a hull 612 of a watercraft, of which only a portion is shown in broken lines. As shown, water enters the tunnel 614 of the jet propulsion system 600 through an inlet grate 616 and intake ramp 618. From the water intake ramp 618, water enters into the jet pump (or jet propulsion unit) 624, which is supported above a ride plate 625. The jet pump 624 includes an impeller 626 that is rotationally coupled to an engine by one or more shafts 632, such as a drive shaft and/or an impeller shaft. The rotation of the impeller 626 pressurizes the water, which then moves over a stator 628. The stator 628 is attached to a jet propulsion unit housing 636 and decreases the rotational motion of the water so that almost all the energy given to the water is used for thrust, as opposed to swirling the water. As shown, the impeller 626 and the stator 628 are both disposed within the jet propulsion unit housing 636 or pump housing. However, it is also known to position the stator 628 at a position outside of the housing 636 downstream of the housing 636.

Once the water leaves the jet pump 624, it accelerates further through a venturi 640. In this prior art jet propulsion system 600, the venturi 640 is disposed at the rearward end of the housing 636. As shown, the venturi 640 is attached to the housing 636 and defines the outlet from the housing 636. A steering nozzle 644 is pivotally attached to the venturi 640 so as to pivot about a vertical axis.

A water passage 646, through which water passes from left to right, is illustrated in FIG. 15. Moving from left to right in this illustration, which is upstream to downstream, the water passage 646 is defined by the inlet grate 616, the water intake ramp 618, the jet pump 624, the venturi 640, and the steering nozzle 644.

Because a discharge opening 640a of the venturi 640 is smaller than its inlet opening 640b, the water is accelerated through the venturi 640. As would be appreciated by one of ordinary skill in fluid dynamics, the size (cross-sectional area and/or shape) of the discharge opening 640a of the venturi 640 relative to its inlet opening 640b and the remaining water passage 646 determines several key operating parameters of the jet propulsion system 600. If the discharge opening 640a is relatively small, the jet propulsion system 600 pushes a smaller volume of faster moving water out through the discharge opening 640a. The small discharge opening 640a could results in a higher top speed, but a slower acceleration for the watercraft. Conversely, if the discharge opening 640a is relatively larger, the jet propulsion system 600 pushes a larger volume of slower moving water out through the discharge opening 610 to propel the system 600. The larger discharge opening 640a could therefore results in a slower top speed, but a faster acceleration. Furthermore, an optimized intermediately-sized discharge opening 640a would give optimum fuel economy at a given speed, yet would not result in top speed or high acceleration.

Because conventional venturis 640 have fixed-area discharge openings, venturi designers must balance the competing goals of maximizing top speed, acceleration, and fuel efficiency when designing venturis 640. Further, the only way to control the thrust in a fixed-area venturi is to control the engine speed.

One way of addressing these problems is to vary the flow volume through the venturi. This has been attempted in various ways in the prior art. To maximize top speed, acceleration, and fuel efficiency using a single venturi, variable venturis have been developed that vary the cross-sectional area of the discharge opening during operation of the jet propulsion system and watercraft. Such variable venturis allow watercraft to dynamically, selectively maximize top speed, acceleration, or fuel efficiency at any given instant by changing the cross-sectional area of the discharge opening of the venturi. Some examples of various methods of dynamically altering the cross-sectional area of the discharge opening include U.S. Pat. Nos. 5,338,234, 5,658,176, 5,679,035, 5,683,276, 5,700,170, and 5,863,229. Unfortunately, these conventional variable venturis suffer from drawbacks.

SUMMARY OF THE INVENTION

In view of the foregoing, a need has developed for a watercraft with a jet propulsion system having a variable venturi that is simpler than conventional variable venturis and results in smooth water flow through the variable venturi.

Therefore, one aspect of embodiments of this invention provides a watercraft with a jet propulsion system that has a variable venturi that is mechanically simple.

Another aspect of the embodiments of this invention provides a watercraft having a jet propulsion system with a variable venturi that permits smooth water flow through the variable venturi.

Another aspect of embodiments of the present invention provides a jet propulsion system for a watercraft that has an impeller and a pump housing enclosing the impeller. The jet propulsion system also includes a venturi coupled to the pump housing and having a flexible portion that has a discharge opening with a cross-sectional shape and an area. The jet propulsion system further includes at least one movable member associated with the flexible portion. The jet propulsion system further includes an actuator coupled to the at least one movable member to selectively move the at least one movable member to flex the flexible portion and alter the cross-sectional shape and the area of the discharge opening.

Another aspect of embodiments of the present invention provides a jet propulsion system for a watercraft that has an impeller, a pump housing enclosing the impeller, and a venturi coupled to the pump housing. The venturi has a rearward discharge opening and at least one additional discharge passage permitting fluid communication between an inside of the venturi and an ambient environment. The jet propulsion system further includes a valve disposed in the at least one additional discharge passage. The jet propulsion system further includes an actuator connected to the at least one valve to selectively regulate fluid flow through the at least one additional discharge passage.

Another aspect of embodiments of the present invention provides a jet propulsion system for a watercraft that has an impeller, a pump housing enclosing the impeller, and a venturi coupled to the pump housing. The venturi has a flexible, tubular portion that defines a discharge opening. The jet propulsion system also includes a collar mounted to the flexible, tubular portion and an actuator connected to the collar. The actuator selectively tightens the collar to squeeze the flexible, tubular portion radially inwardly and reduce a cross-sectional area of the discharge opening.

Another aspect of embodiments of the present invention provides a jet propulsion system for a watercraft that has an impeller, a pump housing enclosing the impeller, and a venturi coupled to the pump housing. The venturi has a body portion with first and second planar interior surfaces spaced in a generally parallel relationship, and an end flap coupled to the body portion and movable between first and second positions relative to the body portion. The end flap is disposed between the first and second interior surfaces and has side walls that substantially abut the first and second interior surfaces when the end flap is in the first and second positions. The body portion and the end flap each have rearward edges that define a discharge opening. The jet propulsion system further includes an actuator connected to the end flap. The actuator moves the end flap relative to the body portion between the first and second positions. A cross-sectional area of the discharge opening is larger when the end flap is in the first position than in the second position.

Another aspect of embodiments of the present invention provides a jet propulsion system for a watercraft that has an impeller and a pump housing enclosing the impeller. The jet propulsion system also includes a venturi having an inlet coupled to the pump housing, an outlet with a discharge area, and a relatively continuous inner surface extending from the inlet to the outlet. The jet propulsion system further includes an actuator connected to the venturi that selectively changes the discharge area of the outlet while maintaining the continuous inner surface.

The above-described embodiments of jet propulsion systems according to the present invention may be operatively mounted in a watercraft. The watercraft includes a hull supporting the jet propulsion system and an engine supported by the hull and operatively connected to the jet propulsion system. The jet propulsion system may further comprise a venturi controller operatively connected to the actuator to automatically control the venturi discharge area.

Additional and/or alternative aspects, objects, and features of the embodiments of this invention will become apparent upon reading the following disclosure in accordance with the Figures.

BRIEF DESCRIPTION OF THE DRAWINGS

An understanding of the various embodiments of the invention may be gained by virtue of the following figures, of which like elements in various figures will have common reference numbers, and wherein:

FIG. 4 is a rear view of a variable venturi of the watercraft of FIG. 1 with the variable venturi in a large-discharge-opening position;

FIG. 5 is a rear view of the variable venturi of FIG. 4 in a small-discharge-opening position;

FIG. 7A is a left, rear perspective view of an additional alternative embodiment of a variable venturi according to the present invention with the variable venturi in a large-discharge-opening position;

FIG. 7B is a rear view of the variable venturi of FIG. 7A with the variable venturi in the large-discharge-opening position;

FIG. 7C is a left, rear perspective view of the variable venturi of FIG. 7A with the variable venturi in a small-discharge-opening position;

FIG. 7D is a rear view of the variable venturi of FIG. 7A with the variable venturi in the small-discharge-opening position;

FIG. 8A is a right, rear perspective view of a further alternative embodiment of a variable venturi according to the present invention;

FIG. 8B is a side view of an alternative embodiment of the variable venturi of FIG. 8A.

DETAILED DESCRIPTION OF PREFERRED EMBODIMENTS

Embodiments of the present invention are described with reference to a PWC for purposes of illustration only. It is to be understood that the jet propulsion systems and variable venturis described herein can be utilized in any watercraft. For example, the jet propulsion systems disclosed herein may also be useful in small boats or other floatation devices other than those defined as personal watercrafts. Simply stated, the variable venturis described herein may be used with any type of jet propulsion system.

Figure 1:
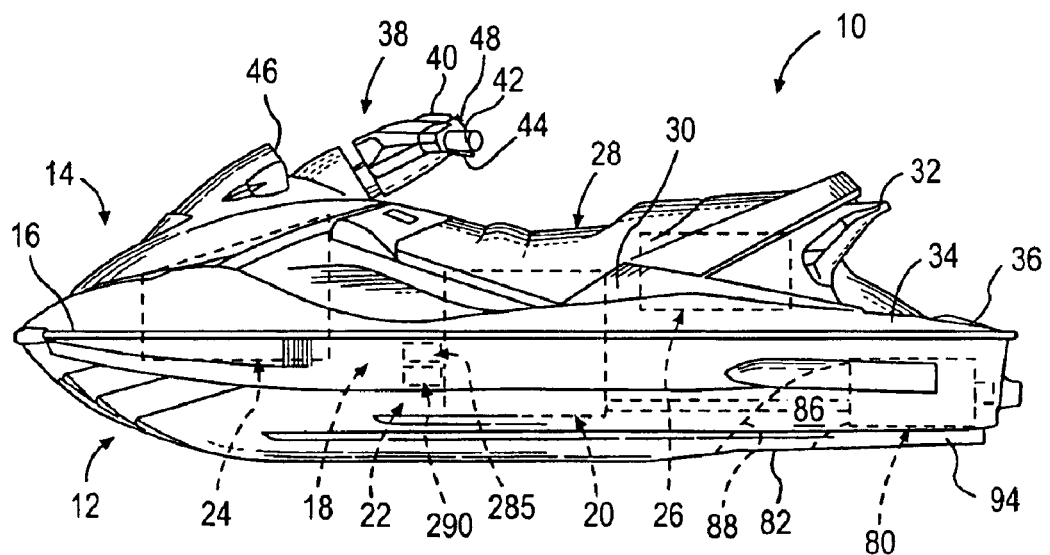
FIG. 1 is a side view of a watercraft in accordance with a preferred embodiment of the present invention.

The general construction of a personal watercraft 10 in accordance with a preferred embodiment of this invention is shown in FIG. 1. The following description relates to one way of manufacturing a PWC according to a preferred design. Obviously, those of ordinary skill in the watercraft art will recognize that there are other known ways of manufacturing and designing watercraft and that this invention encompasses other known ways and designs.

As illustrated in FIG. 1, the watercraft 10 is made of two main parts, a hull 12 and a deck 14. The hull 12 buoyantly supports the watercraft 10 in the water. The deck 14 is designed to accommodate a rider and, in some watercraft, one or more passengers. The hull 12 and deck 14 are joined together at a seam 16 that joins the parts in a sealing relationship. Preferably, the seam 16 comprises a bond line formed by an adhesive. Of course, other known joining methods could be used to sealingly engage the parts together, including but not limited to thermal fusion, molding or fasteners such as rivets or screws.

The space between the hull 12 and the deck 14 forms a volume commonly referred to as the engine compartment 18 (shown in phantom in FIG. 1). Shown schematically in FIG. 1, the engine compartment 18 accommodates an engine 20, as well as a muffler, tuning pipe, gas tank, electrical system (battery, etc.), venturi controller 22, air box, storage bins 24, 26, and other elements required or desirable in the watercraft 10.

The deck 14 has a centrally positioned straddle-type seat 28 positioned on top of a pedestal 30 to accommodate a rider in a straddling position.

A grab handle 32 may be provided between the pedestal 30 and the rear of the seat 28 to provide a handle onto which a passenger may hold.

The watercraft 10 has a pair of generally upwardly extending gunnels (or gunwales or walls) 34 located on either side of the watercraft 10.

A reboarding platform 36 is provided at the rear of the watercraft 10 on the deck 14 to allow the rider or a passenger to easily reboard the watercraft 10 from the water.

A helm assembly 38 is positioned forwardly of the seat 28. The helm assembly 38 has a central helm portion 40 that may be padded, and a pair of steering handles 42, which are also referred to as a handle bar. One of the steering handles 42 is preferably provided with a throttle lever 44, which allows the rider to control the speed of the watercraft 10. A display area or cluster 46 is located forwardly of the helm assembly 38. The display cluster 46 can be of any conventional display type, including LCD (liquid crystal displays), dials or LED (light emitting diodes). The central helm portion 40 may also have various buttons, which could alternatively be in the form of levers or switches, that allow the rider to modify the display data or mode (speed, engine rpm, time . . . ) on the display cluster 46 or to change a condition of the watercraft 10 such as trim (the pitch of the watercraft).

The helm assembly 38 may also be provided with a key receiving post 48, preferably located near a center of the central helm portion 40. The key receiving post 48 is adapted to receive a key (not shown) that starts the watercraft 10. As is known, the key is typically attached to a safety lanyard (not shown). It should be noted that the key receiving post 48 may be placed in any suitable location on the watercraft 10.

Figure 2:
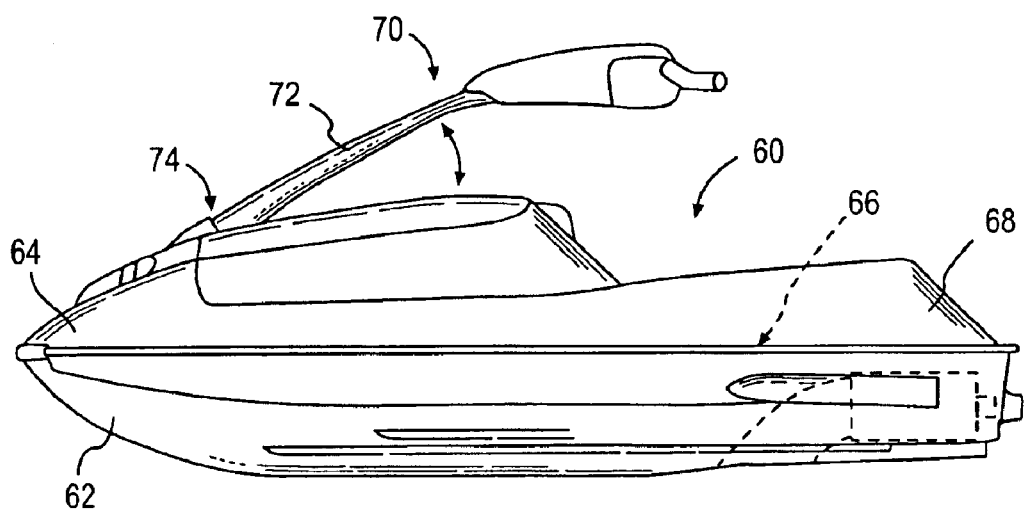
FIG. 2 is a side view of an alternative watercraft according to the present invention.

This invention may alternatively be embodied in a stand-up type personal watercraft 60, as illustrated in FIG. 2. Stand-up watercraft 60 are often used in racing competitions and are known for high performance characteristics. Typically, such stand-up watercraft 60 have a lower center of gravity and a more concave hull 62. The deck 64 may also have a lower profile. In the watercraft 60, the seat is replaced with a standing platform 66. The operator stands on the platform 66 between the gunnels 68 to operate the watercraft 60. The steering assembly 70 is configured as a pivoting handle pole 72 that tilts up from a pivot point 74 during operation. At rest, the handle pole 72 folds downwardly against the deck 64 toward the standing platform 66. Otherwise, the components and operation of the watercraft 60 are similar to watercraft 10.

Figure 3:
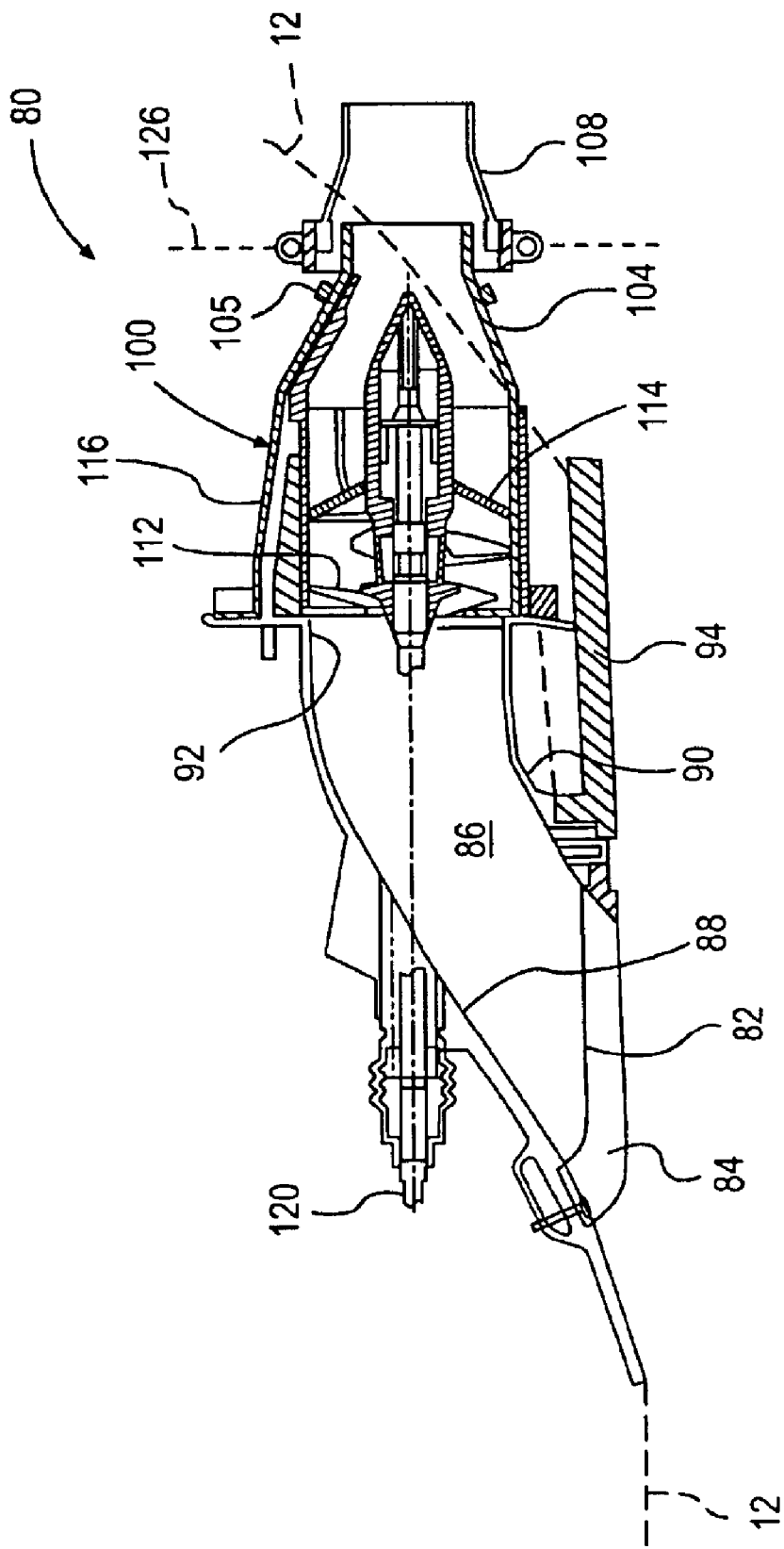
FIG. 3 is an enlarged partial side view in cross section of the stern of the watercraft shown in FIG. 1 showing the watercraft's jet propulsion system.

As shown schematically in FIG. 1 and cross-sectionally in FIG. 3, the watercraft 10 is generally propelled by a jet propulsion system 80. As known, the jet propulsion system 80 pressurizes water to create thrust. The water is first scooped from under the hull 12 through an inlet 82, which preferably has a grate 84 (shown in detail in FIG. 3). Water flows from the inlet 82 through a water intake ramp 86. The hull 12 forms a top portion 88 of the water intake ramp 86, while a ride shoe 90 forms the bottom portion of the intake ramp 86. Alternatively, the intake ramp 86 may be a single piece or an insert to which the jet propulsion system 80 attaches. In such cases, the intake ramp 86 and the jet propulsion system 80 are attached as a unit in a recess in the bottom of hull 12.

From the intake ramp 86, water enters the jet propulsion system 80. The jet propulsion system 80 is located in a formation in the hull 12, referred to as a tunnel 92. The tunnel 92 is defined at the front, sides, and top by the hull 12 and is open at the transom 54. The bottom of the tunnel 92 is closed by a ride plate 94, which creates a surface on which the watercraft 10 rides or planes at high speeds.

As best illustrated in FIG. 3, the jet propulsion system 80 includes, among other elements, a jet propulsion unit (or jet pump) 100, a variable venturi 104, a venturi discharge opening control mechanism 105, and a nozzle 108. As illustrated schematically in FIG. 1, the jet propulsion system 80 also includes a venturi controller 22 that is operatively connected to the venturi discharge opening control mechanism 105.

The jet propulsion unit (or jet pump) 100 comprises three main parts, an impeller 112, a stator 114, and a housing 116, as is known. The impeller 112 is housed within the housing 116 and is coupled to the engine 20 by one or more shafts 120, such as a drive shaft and/or an impeller shaft. Alternatively, the one or more shafts 120 could be operatively connected to one another through a gearbox or clutch.

In the illustrated embodiment, the housing 116 has a relatively constant cross-sectional shape over its longitudinal length. However, such a constant cross-section is not required by the present invention. For example, the rearward end of the housing may taper radially inwardly, thereby reducing the cross-sectional area of the housing 116 as the housing approaches the front end of the venturi 104.

Rotation of the impeller 112 pressurizes the water, which then moves over the stator 114, which is made of a plurality of fixed stator blades that are mounted within the housing 116. The stator blades decrease the rotational motion of the water so that almost all the energy given to the water is used for thrust, as opposed to swirling the water. Once the water leaves the jet pump 100, it travels through the variable venturi 104, which is described in greater detail below. The steering nozzle 108 pivotally attaches to the venturi 104 so as to pivot about a vertical axis 126. The steering nozzle 108 could also be supported at the exit of the tunnel 92 in other ways without a direct connection to the venturi 104. Alternatively, the nozzle 108 may be replaced by a rudder that re-directs the pressurized water for steering after the water exits the venturi 104.

The steering nozzle 108 is operatively connected to the helm assembly 38 preferably via a push-pull cable (not shown) such that when the helm assembly 38 is turned, the steering nozzle 108 pivots. This movement redirects the water coming from the venturi 104 and steers the watercraft 10 in the desired direction. Optionally, the steering nozzle 108 may be gimbaled to allow it to move around a second horizontal pivot axis (not shown). The up and down movement of the steering nozzle 108 provided by this additional pivot axis is known as trim and controls the pitch of the watercraft 10.

As illustrated in FIG. 1, when the watercraft 10 is moving, its speed is measured by a speed sensor 130 attached to the transom 54 of the watercraft 10. The speed sensor 130 has a paddle wheel (not shown) that is turned by the flow of water. In operation, as the watercraft 10 goes faster, the paddle wheel turns faster in response. The speed sensor 130 may also be placed in the ride plate 94 or at any other suitable position. Alternatively, other types of speed sensors, such as pitot tubes, could be used, as would be readily recognized by one of ordinary skill in the art. Preferably, an engine speed sensor is also provided. Such a sensor could be an engine revolutions per minute (RPM) sensor and/or a throttle position sensor (TPS). A pressure sensor could also be provided in the jet propulsion system to determine the water pressure inside the jet propulsion system.

As illustrated in FIG. 1, the watercraft 10 may be provided with the ability to move in a reverse direction. With this option, a reverse gate 140 is used. The reverse gate 140 is pivotally attached to the sidewalls of the tunnel 92 or directly on the venturi 104 or the steering nozzle 108. To make the watercraft 10 move in a reverse direction, the rider pulls on a reverse handle 142 that operatively connects to the reverse gate 140. The reverse gate 140 then pivots in front of the outlet of the steering nozzle 108 and redirects the water leaving the jet propulsion system 80 towards the front of the watercraft 10, thereby thrusting the watercraft 10 rearwardly. The reverse handle 142 can be located in any convenient position near the operator, for example adjacent the seat 28 as shown or on the helm 38.

FIGS. 3–5 illustrate a first embodiment of the variable venturi 104 and venturi discharge opening control mechanism 105 according to the present invention. FIG. 4 illustrates the venturi 104 and venturi discharge opening control mechanism 105 in a large-discharge-opening position while FIGS. 3 and 5 illustrate the venturi 104 and venturi discharge opening control mechanism 105 in a small-discharge-opening position.

As illustrated in FIG. 4, the venturi 104 comprises a flexible, tubular portion. In this embodiment, the flexible, tubular portion comprises a plurality of flexible, circumferentially-spaced, sections 200, 204, 208, 212, 216, 220. Because the sections 200, 204, 208, 212, 216, 220 are preferably identical to each other, only one section 200 is described in detail. As illustrated in FIG. 3, a forward end of the section 200 is clamped, bolted, or otherwise fixed to the rearward outlet of the jet propulsion unit 100. The section 200 extends rearwardly from the jet propulsion unit 100 and is generally arc-shaped as viewed from the rear (see FIG. 4). In the large-discharge-opening position illustrated in FIG. 4, circumferential ends (or end surfaces) 200a, 200b of the section 200 face adjacent circumferential ends 220b, 204a, respectively, of adjacent sections 220, 204, respectively. Facing circumferential ends 200a, 220b and 200b, 204a may touch each other or be spaced from each other when the venturi 104 is in the position illustrated in FIG. 4.

The circumferential ends 200a, 200b are slanted relative to a radial direction of an axis 224 of the venturi 104. Consequently, a radially-inward portion of the circumferential end 200b is disposed radially-inwardly from a radially-outward portion of the circumferential end 204a. Consequently, the sections 200, 204, 208, 212, 216, 220 overlap each other in a fan-like configuration.

In the illustrated embodiment, the sections 200, 204, 208, 212, 216, 220 are distinct and are separately connected to the jet propulsion unit 100. The edges of each section 200, 204, 208, 212, 216, 220 are formed at an angle that complements the adjacent section 200, 204, 208, 212, 216, 220. By this, the sections 200, 204, 208, 212, 216, 220 can slide laterally or circumferentially with respect to each other. Additionally, this creates an overlap between sections 200, 204, 208, 212, 216, 220, even in the largest position, to prevent leakage. Alternatively, the sections 200, 204, 208, 212, 216, 220 may be integrally formed. If formed integrally, the sections 200, 204, 208, 212, 216, 220 may be formed from a single, hollow, frusto-conically shaped piece of flexible material. The material is axially cut to form the circumferential ends of adjacent sections 200, 204, 208, 212, 216, 220. The axial cuts that form the sections may only extend over the a rearward portion of the venturi such that forward portions (the portions that connect to the jet propulsion unit 100) remain integrally connected to each other.

The illustrated section 200 is preferably formed of plastic material. However, a variety of other strong, flexible materials may also be used to form the section 200 without deviating from the scope of the present invention. For example, the section 200 may comprise rubber, a synthetic, flexible material, or thin metal sheets.

While the illustrated venturi 104 includes six sections 200, 204, 208, 212, 216, 220, the venturi 104 could alternatively include greater or fewer sections without deviating from the scope of the present invention.

Rearward, radially-inward edges of the sections 200, 204, 208, 212, 216, 220 combine to define a perimeter of a rearward discharge opening 228. As illustrated in FIG. 4, when the venturi 104 is in the large-discharge-opening position, the discharge opening 228 has a generally-circular, relatively-large, cross-sectional area.

The venturi discharge opening control mechanism 105 mounts onto the venturi 104 to control the size of the discharge opening 228. In this embodiment, the venturi discharge opening control mechanism 105 comprises a tightening mechanism (or actuator) 244 that is operatively connected to a selectively-tightening collar 240 mounted to the outer circumferential side of the venturi 104. The collar 240 includes an arc-shaped strip 242 with first and second ends 242a, 242b.

The tightening mechanism 244 extends between the first and second ends 242a, 242b. The tightening mechanism 244 comprises a selectively-slidable cable 246 slidably retained within a sheath 248. An end of the cable 246 is connected to the first end 242a of the strip 242. Conversely, an end of the sheath 248 is connected to the second end 242b of the strip 242. Selective movement of the cable 246 relative to the sheath 248 expands and contracts the collar 240. FIG. 4 illustrates the collar 240 in its expanded position, while FIG. 5 illustrates the collar 240 in its contracted position.

It should be understood that the illustrated relative sizes of the discharge openings (e.g., discharge opening 228) illustrated throughout the figures may be exaggerated to more clearly show the difference between the sizes of the discharge openings in its various positions. The actual variable range of the discharge openings may be larger or smaller than those illustrated, as would be appreciated by one of ordinary skill in the art.

As illustrated in FIG. 5, selective contraction of the collar 240 pushes (or squeezes) the sections 200, 204, 208, 212, 216, 220 radially-inwardly into the small-discharge-opening position. As the collar 240 pushes the sections 200, 204, 208, 212, 216, 220 radially-inwardly, the slanted facing circumferential ends 200b, 204a, for example, slide over each other such that the circumferential end 200b moves radially-inwardly relative to the circumferential end 204a. Consequently, the circumferential end 200b slides along an inner circumferential side 204c of the section 204. As the same sliding process occurs at each intersection between adjacent sections 200, 204, 208, 212, 216, 220, the perimeter and cross-sectional area of the discharge opening 228 shrinks. Because the venturi 104 includes six sections 200, 204, 208, 212, 216, 220, the shape of the relatively-small discharge opening 228 illustrated in FIG. 5 may range from generally-circular to generally-hexagonal.

To enlarge the discharge opening 228, the collar 240 is expanded. This expansion allows water pressure exerted on the inner radial sides of the sections 200, 204, 208, 212, 216, 220 to push the sections 200, 204, 208, 212, 216, 220 radially outwardly, thereby increasing the size of the discharge opening 228 and moving the venturi 104 into the large-discharge-opening position.

Figure 6:
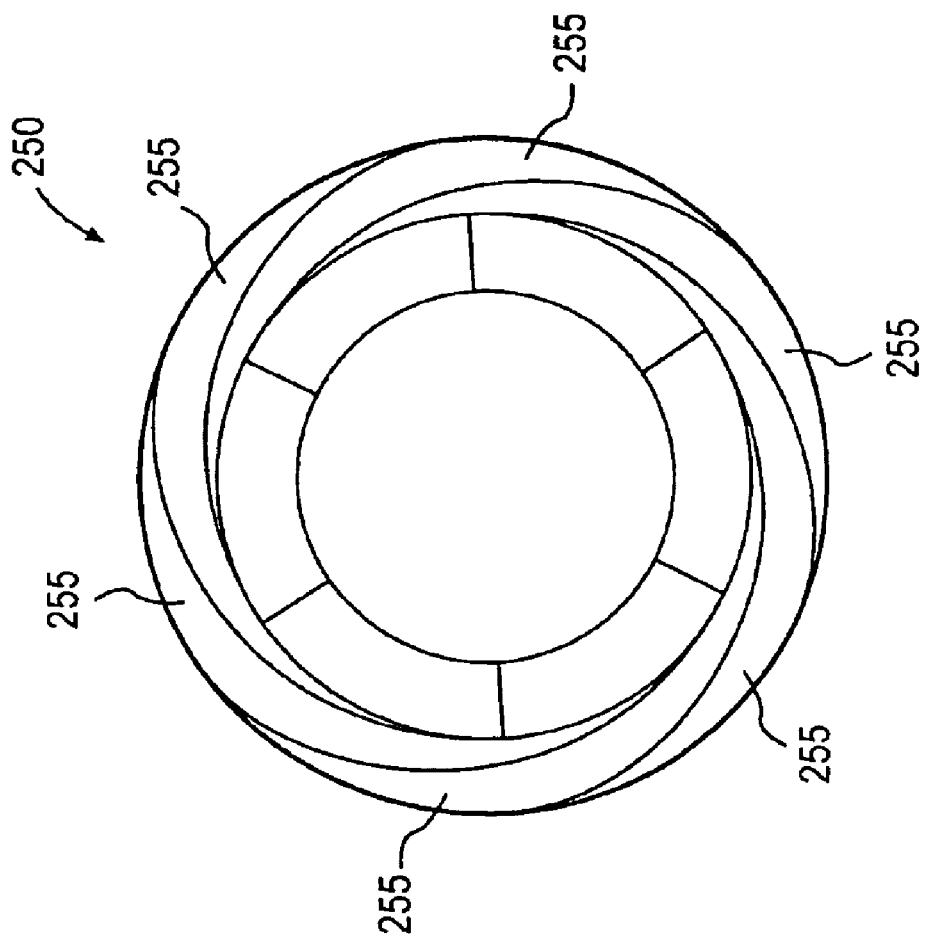
FIG. 6 is a rear view of an alternative embodiment of a variable venturi according to the present invention with the variable venturi in a large-discharge-opening position.

While the illustrated section 200 has distinct inner and outer circumferential sides 200c, 200d and circumferential ends 200a, 200b, the present invention does not require such precise distinctions. For example, FIG. 6 illustrates an alternative venturi 250 that may replace the venturi 104. In the venturi 250, each of the six circumferential sections extends over an arc of about 120 degrees such that at least one section 255 overlaps two other sections 255 at any position around the circumference of the venturi 250. Each section 255 could alternatively overlap greater or fewer adjacent sections 255. Furthermore, the overlapping sections 255 may alternatively overlap each other in different directions (i.e., both circumferential ends of a section 255 may be disposed radially outwardly from all other circumferential edges of adjacent sections 255).

While the illustrated flexible, tubular portion comprises a plurality of circumferentially-spaced sections 200, 204, 208, 212, 216, 220, the flexible, tubular portion of the venturi 104 could alternatively comprise a unitary, flexible, tubular portion that can radially compress and expand enough to effectively vary the discharge opening area. Such a tubular portion would preferably comprise a softer, compressible material. When such a unitary, flexible, tubular portion is squeezed radially inwardly by the selectively-tightening collar 240, longitudinally-extending creases or folds may develop in the venturi.

In the illustrated embodiment, the flexible, tubular portion has a generally circular cross-section. However, neither the present invention nor the term "tubular" require the cross-section to be generally circular. Rather, a "tubular" cross-section includes a variety of other non-circular hollow shapes such as ovals, ellipses, etc.

As illustrated schematically in FIG. 1, the venturi controller 22 of the propulsion system 80 operatively connects to the venturi discharge opening control mechanism 105 to selectively adjust the size of the discharge opening 228. In the illustrated embodiment, the venturi controller 22 comprises an electronic control unit (ECU) 285 and an actuator 290. The ECU 285 operatively controls the actuator 290, which, in turn, operatively connects to the discharge opening control mechanism 105 to control the size of the discharge opening 228 of the venturi 104 in response to one or more watercraft 10 parameters. Such parameters may include the position of the throttle lever 44, a speed of the engine 20, and/or a signal from the speed sensor 130. As one of ordinary skill in the art would appreciate, the venturi controller 22 may be designed to control the discharge opening control mechanism 105 in response to various combinations of the these watercraft 10 parameters.

For example, if the sensed speed of the watercraft 10 is significantly lower than the desired speed (as indicated by the position of the throttle lever 44), the controller 22 determines that acceleration should be prioritized over top speed and therefore increases the size of the discharge opening 228 to improve the acceleration of the watercraft 10. Conversely, if the watercraft 10, is already moving as quickly as a large discharge opening 228 will allow but the desired speed is even higher, the controller 22 may determine that top speed is being prioritized over acceleration such that the controller 22 will decrease the size of the discharge opening 228 to increase the top speed of the watercraft 10. Furthermore, if the sensed throttle lever 44 position is somewhere in the middle of its corresponding desired speed range, the controller 22 may analyze the engine 20 speed, the throttle lever 44 position, and the signal of the speed sensor 130 to optimize fuel efficiency of the watercraft 10.

Figure 11:
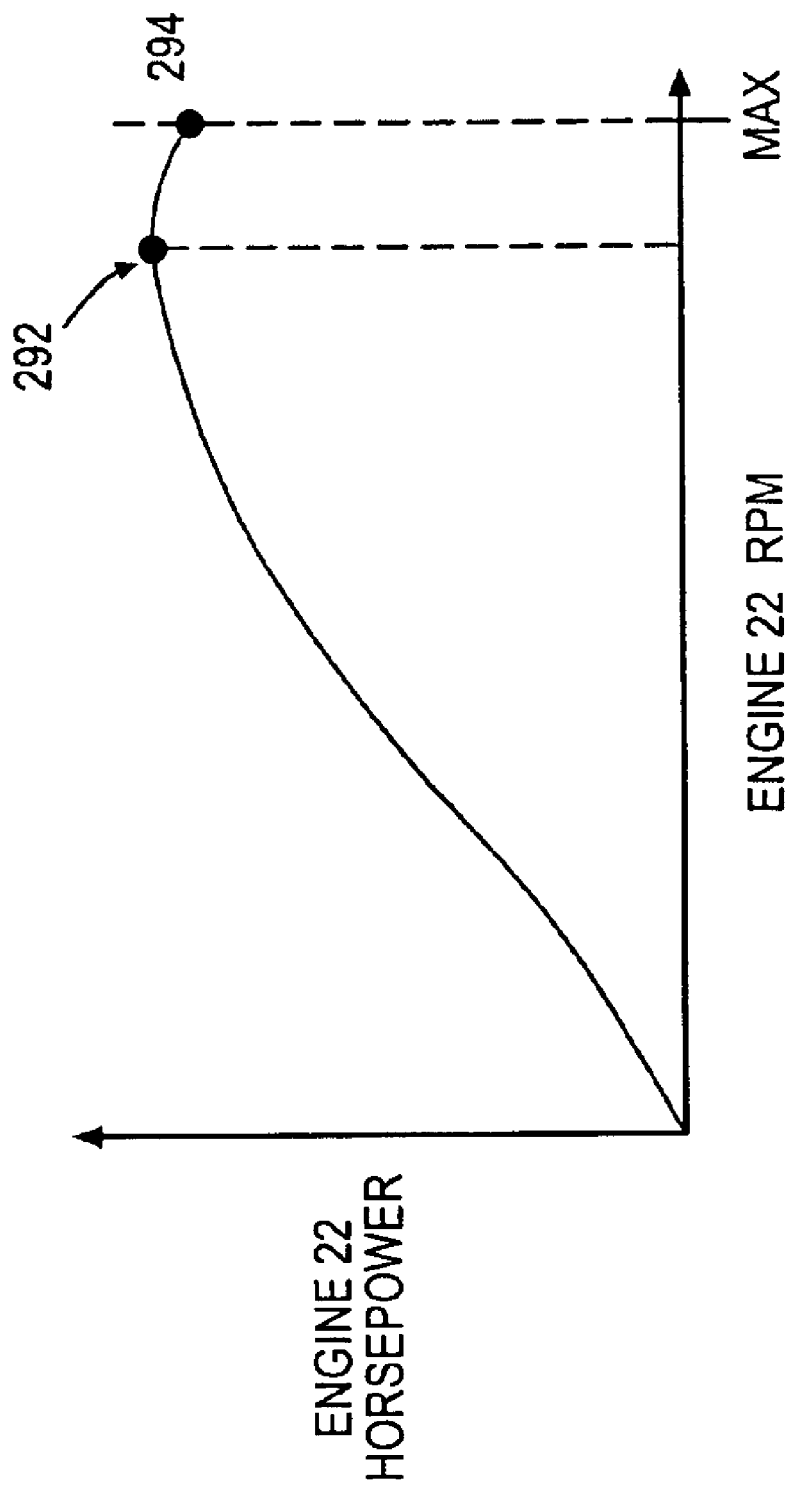
FIG. 11 illustrates a performance curve for an engine according to a preferred embodiment of the present invention.
Figure 12:
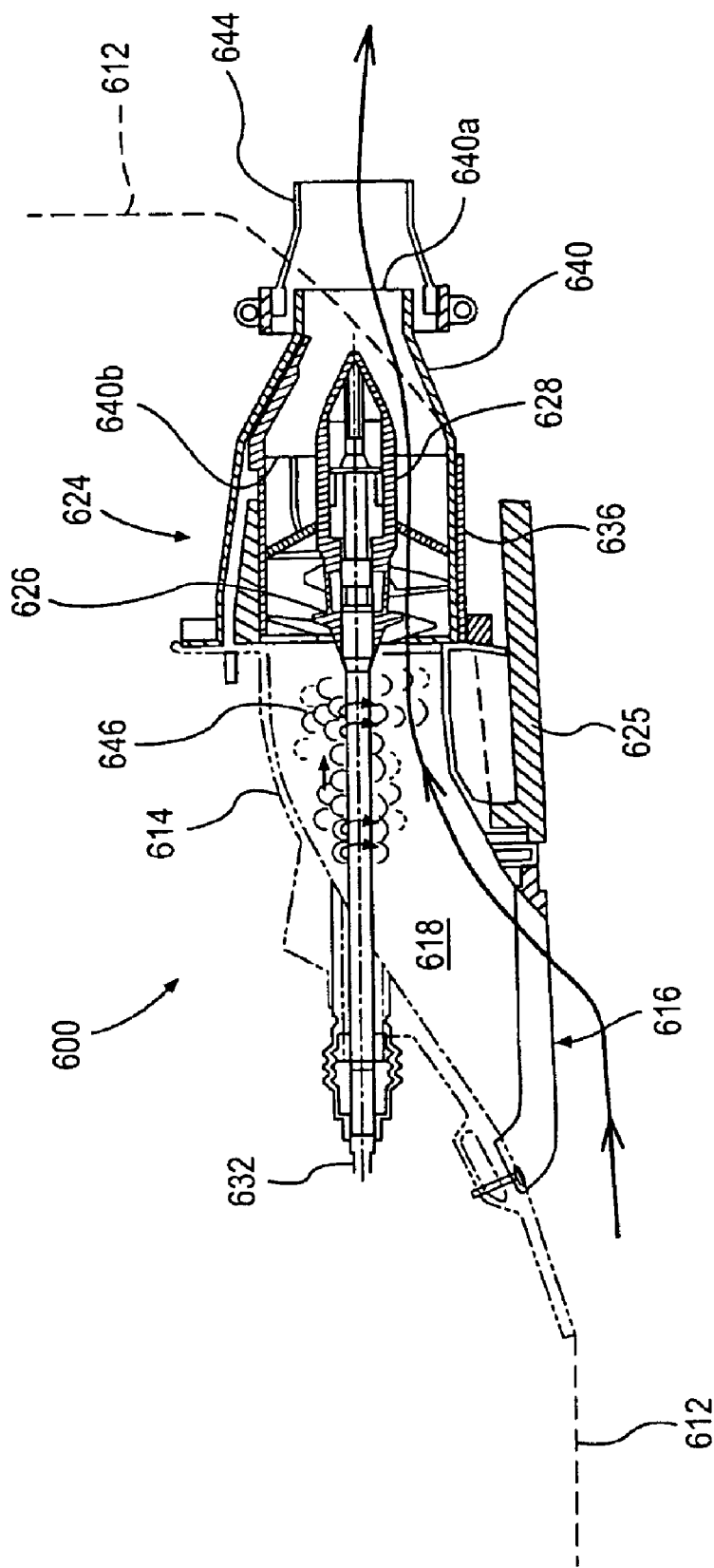
FIG. 12 is a partial side view in cross section of a stern of a watercraft showing a conventional jet propulsion system.

Alternatively, the venturi controller 22 may be designed to maximize the horsepower of the engine 20. FIG. 11 illustrates a performance curve of the engine 20. Over lower rotational speeds (measured on the horizontal axis), increasing the engine 20 speed increases the horsepower of the engine 20 (measured on the vertical axis). However, past a maximum horsepower point 292, the engine 20 horsepower decreases as the speed increases to the maximum rotational speed point 294 of the engine. As would be appreciated by one of ordinary skill in the art, reducing the discharge area of the discharge opening 228 increases a pressure within the jet propulsion system 80 and increases the load on the engine 20, which decreases the rotational speed of the engine 20. Accordingly, by adjusting the discharge opening 228 area, the venturi controller 22 can keep the engine 20 rotating at the speed that corresponds to the maximum horsepower point 292 on the performance curve.

In the illustrated embodiment, the actuator 290 comprises a linear actuator that operatively connects to the cable 246 and sheath 248 (see FIG. 4). The linear actuator may be a hydraulic or pneumatic cylinder, a linear motor, or any other type of actuator that would be known to one of ordinary skill in the art.

While the illustrated venturi controller 22 includes an ECU 285, the venturi controller 22 may alternatively and/or additionally be manually operable. For example, a lever, switch, or dial may be provided on the helm assembly 38 so that the rider can continuously select which watercraft parameter (top speed, top acceleration, or fuel efficiency) to prioritize.

Furthermore, the actuator 290 may alternatively comprise a hydraulic actuator and the venturi controller 22 may comprise a hydraulic connection between an inside of the jet propulsion unit 100 and the hydraulic actuator 290. In such an embodiment, water pressure generated within the propulsion unit 100 would extend and contract the actuator 290 such that as the water pressure in the jet propulsion unit 100 increases, the actuator 290 closes the selectively tightening collar 240 of the discharge opening control mechanism 105 to reduce the area of the discharge opening 228.

FIG. 7 illustrates an alternative venturi 300 and discharge opening control mechanism 310 that may replace the venturi 104 and discharge opening control mechanism 105 in the previous embodiment. FIGS. 7A and 7B illustrate the venturi 300 in its large-discharge-opening position, while FIGS.

7C and 7D illustrate the venturi 300 in its small-discharge opening position.

The venturi 300 includes a forward portion 320 that mounts to the rearward end of the jet propulsion unit 100 (see FIG. 3) via any conventional fastening mechanism. The forward portion 320 may be rigid or flexible. A flexible portion 330 of the venturi 300 extends rearwardly from the forward portion 320. Upper and lower selectively-movable members 360, 370 connect to the flexible portions 330 to selectively control the shape and cross section of the venturi 300. The member 360, 370 can be formed of rigid plastic or metal, for example, and may be attached to the flexible portion 330 or integrally formed therewith. The flexible portion 330 comprises a strong, flexible material such as plastic or rubber and preferably has a smooth interior surface so that water flows smoothly through the venturi 300.

A rearward, interior end of the venturi 300 defines a perimeter 340 of a discharge opening 350. The discharge opening control mechanism 310 comprises actuators 375 connected to the upper and lower selectively-movable members 360, 370, which in turn are connected to upper and lower sides of the flexible portion 330 as described above. Forward ends 360a, 370a of the members 360, 370 are connected to the forward portion 320, the jet propulsion unit 100, or any other suitable portion of the watercraft 10. The connection may be pivotal (as shown in FIGS. 7A–7D) or the members 360, 370 can be fixed to the forward portion 320 and flex slightly to compress or expand the venturi 300. The illustrated members 360, 370 are pivotally connected to the forward portion 320 about laterally extending axes.

The actuators 375 extend between the members 360, 370 and a fixed portion of the watercraft 10 such as the forward portion 320 (as illustrated) or the housing 116 of the jet propulsion unit 100. Alternatively, the actuators 375 may be replaced with a single actuator that extends between the member 360 and the member 370 such that the actuator selectively pushes or pulls the members 360, 370 together or apart.

As with the actuators 290, the actuators 375 may comprise any of a variety of types of linear actuators such as hydraulic, pneumatic, linear electric motor, a sheathed cable (like the tightening mechanism 244), etc. Alternatively, the actuators 375 may be rotational actuators such as geared motors that pivotally connect to the members 360, 370 at the pivotal connection between the members 360, 370 and the forward portion 320.

As would be appreciated by one of ordinary skill in the art, the actuator 290 of the first embodiment would be modified appropriately to operatively control the actuators 375 of the discharge opening control mechanism 310. For example, if the actuators 375 comprise hydraulic actuators, the actuator 290 might include a hydraulic pump. If the actuators 375 comprise linear or electric motors, the actuator 290 would comprise an electrical circuit.

The actuators 375 operate by selectively moving the members 360, 370 toward and away from each other to alter a cross-sectional area and shape of the discharge opening 350. To move the members 360, 370 away from each other, the discharge opening control mechanism 310 may merely release the members 360, 370 from their closely spaced positions so as to allow water pressure in the venturi 300 to spread the members 360, 370 apart from each other. The path of the movable members 360, 370 is preferably substantially vertical. While the illustrated control mechanism 310 includes actuators 375 that move both of the members 360, 370 toward each other, the control mechanism 310 may alternatively include just one actuator 375 that moves just one of the members 360, 370 toward the other stationary member 360, 370 and vice versa.

FIGS. 7A and 7B illustrate the venturi 300 and control mechanism 310 in a large-discharge-opening position. In the large-discharge opening position, the discharge opening 350 is generally circular such that the cross-sectional area within the fixed perimeter 340 is maximized.

As illustrated in FIGS. 7C and 7D, the control mechanism 310 selectively pushes the members 360, 370 toward each other to flex the flexible portion 330 of the venturi 300 and compress the discharge opening 350. When the control mechanism 310 compresses the discharge opening 350, the length of the perimeter 340 remains constant, while the cross-sectional shape of the discharge opening 350 becomes more and more oval shaped and the cross-sectional area of the discharge opening becomes smaller.

As used herein, "oval shaped" encompasses all shapes that lack sharp angles and include a major axis direction that is larger than a minor axis direction. An "oval shape" need not even be symmetrical relative to its major or minor axis. In the embodiment shown in FIGS. 7B and 7D, the major axis is a horizontal/lateral axis 374 and the minor axis is the vertical axis 376.

In the illustrated embodiment, the control mechanism 310 compresses the discharge opening 350 vertically along the vertical axis 376 such that the oval shape is elongated along the horizontal axis 374. Alternatively, the control mechanism 310 may be designed to compress the discharge opening 350 into a variety of other shapes and orientations. For example, the members 360, 370 may alternatively be positioned to compress the discharge opening 350 along the horizontal axis 374 to elongate the opening 350 in a vertical direction. Additionally, the number of selectively-movable members 360, 370 can vary. It is possible to use a single member or more than two members. As would be understood by one of ordinary skill in the art, the number of members will vary the cross-sectional shape of the discharge opening.

In both the large- and small-discharge-opening positions, the interior surface of the venturi 300 remains smooth and continuous such that water flows smoothly therethrough.

FIG. 8A illustrates an additional alternative venturi 400 and discharge opening control mechanism 410 that may replace the venturi 104 and control mechanism 105 of the first embodiment.

The venturi 400 comprises a rigid venturi that mounts at its forward end to the rearward end of the jet propulsion unit 100 (see FIG. 3). In the illustrated embodiment, the attachment between the venturi 400 and jet propulsion unit 100 comprises bolts (not shown) that fit into bolt anchors 420 (see FIG. 8A) at the forward end of the venturi 400 and connect to the jet propulsion unit 100. An interior, rearward edge of the venturi 400 defines a main rearward discharge opening 430 that has a fixed cross-sectional shape and area. Of course, any type of fastening mechanism could be used, including a venturi that is integral with the jet propulsion unit 100.

The venturi 400 also includes a plurality of additional discharge passages 440 that permit fluid communication between an interior of the venturi 400 and an ambient environment. In the illustrated embodiment, holes inside of the venturi 400 define interior ends 440a of the discharge passages 440 and open into the interior of the venturi 400 near a forward end of the venturi 400. Alternatively, the interior ends 440a could be positioned elsewhere on the venturi 400. The illustrated embodiment includes six circumferentially-spaced passages 440. However, greater or fewer passages 440 may be provided without deviating from the scope of the present invention.

As illustrated in FIG. 8A, the passages 440 preferably each include a tube 450 that extends rearwardly from the interior end 440a. The cross-sectional area of each additional discharge passage 440 is preferably substantially smaller than the cross-sectional area of the main rearward discharge opening 430. A rearward end of each tube 450 defines an exterior end 440b of each passage 440. Each tube 450 helps to direct water rearwardly to provide forward thrust to the watercraft 10 when water flows through the passages 440. The tubes 450 provide additional cross-sectional area for water to flow through from the jet propulsion unit 100.

The tubes 450 can also be formed integrally with the housing forming the venturi 400. For example, additional passages can be molded into the side wall of the venturi 400.

The interior shape of the passages 440 is preferably streamlined so that water flows smoothly through the passages 440. For example, while the passages 440 make approximately a 90 degree bend between the outwardly-radially extending interior end 440a and the axially extending tubes 450, the bend preferably comprises a curve (as opposed to a sharp angle) that minimizes the pressure drop and cavitation through the passages 440.

FIG. 8B shows an alternative embodiment of the venturi of FIG. 8A, and identical components have been labeled with the same numeral in both figures. In this embodiment, each passage 440' consist of a tube 450' having an interior end 440a' in fluid communication with the interior of the venturi 400, and an exterior end 440b'. The longitudinal axes of tubes 450' are parallel to a longitudinal axis of the venturi 400, such that no bends are present therein, minimizing pressure drop and cavitation through the passages 440'.

Returning to FIG. 8A, the discharge opening control mechanism 410 comprises a selectively-openable valve 460, which includes an actuator operatively connected to a valve, disposed in each of the at least one additional discharge passages 440. If the discharge passages include tubes 450 (as illustrated), the selectively-openable valves 460 are preferably operatively positioned in the tubes 450. Alternatively, the selectively-openable valves 460 could be positioned at the beginning of the passages 440. Each of the selectively-openable valves 460 is operatively connected to the venturi controller 22 such that the controller 22 controls the state of the valves 460 (i.e., open, closed, or in one of numerous partially open positions).

The selectively-openable valves 460 may comprise any type of conventional selectively openable valves. For example, the actuator of each selectively-openable valve 460 may be a solenoid, a motor, etc. that is operatively connected to the venturi controller 22. The operative connection can be mechanical, electric, pneumatic, or hydraulic.

The discharge opening 430 and the additional discharge passages 440 together form a combined discharge opening with a combined discharge area. If the valves 460 are closed, the combined discharge area equals the cross-sectional discharge area of the main discharge opening 430. When the venturi controller 22 opens the valves 460, water thrusts rearwardly from the venturi 400 through both the main discharge opening 430 and the additional discharge passages 440 such that the additional discharge passages 440 effectively increase the size of the discharge opening 430.

Figure 9:
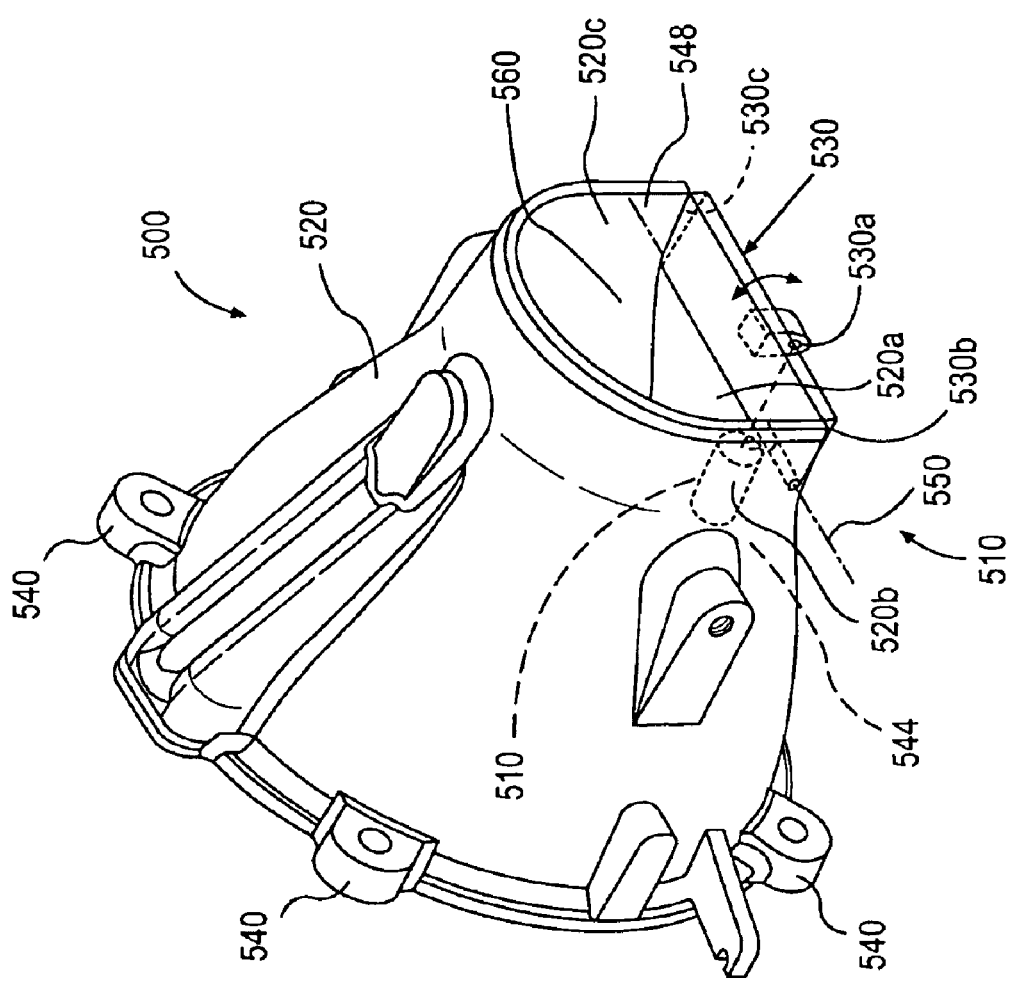
FIG. 9 is a left, rear perspective view of a further alternative embodiment of a variable venturi according to the present invention with the variable venturi in a large-discharge-opening position.
Figure 10:
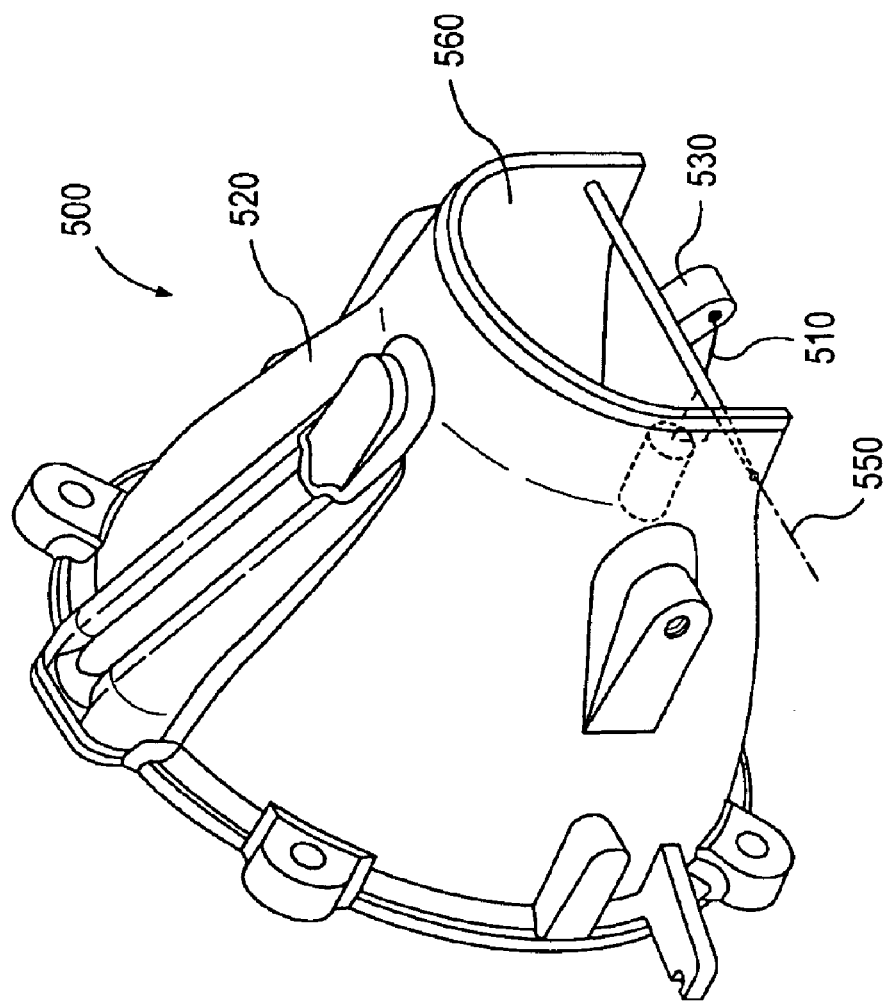
FIG. 10 is a left, rear perspective view of the variable venturi of FIG. 9 with the variable venturi in a small-discharge-opening position.

FIGS. 9 and 10 illustrate an additional alternative venturi 500 and discharge opening control mechanism 510, which may replace the venturi 104 and discharge opening control mechanism 105 of the first embodiment.

The venturi 500 comprises two main components, a body portion 520 and a movable portion or end flap 530. The body portion 520 is preferably rigid and mounts at its forward end to the jet propulsion unit 100 (see FIG. 3) via bolt anchors 540 or other suitable attachment mechanisms. The forward end of the body portion 520 is preferably generally circular in cross section. As the cross-section of the body portion 520 moves rearwardly, a bottom portion 520a and two side portion 520b, 520c flatten out such that, as viewed from the rear, approximately 90 degree angles form at the intersections between the bottom portion 520a and the side portions 520b, 520c. Consequently, the rearward end of the body portion 520 is mousehole shaped (i.e. curved/arched top and flat bottom and lower sides). The side portions 520b, 520c extend rearwardly farther than the bottom portion 520a and define vertically-extending, planar, interior, side surfaces 544, 548. The side surfaces 544, 548 are parallel to each other and spaced from each other.

The end flap 530 extends rearwardly from the bottom portion 520a of the body portion 520. In the illustrated embodiment, the end flap 530 comprises a rigid material that is connected to the bottom portion for relative pivotal movement about a generally horizontal, laterally-extending axis 550. Alternatively, the end flap 530 could include a flexible forward end that rigidly attaches to the body portion 520 to allow the movable portion to flex relative to the body portion 520 in a direction and manner than is generally similar to the pivotal connection illustrated. The flexing movable portion would advantageously avoid the sharper angles associated with the pivoting movable portion 520. Of course, the end flap 530 could be movable about any axis, including a vertical axis at either side of the venturi 500 or a horizontal axis at the top of the venturi 500.

An interior surface 530a of the end flap 530 is preferably generally planar. The end flap 530 has first and second lateral ends (or side walls) 530b, 530c that substantially abut the side surfaces 544, 548, respectively, of the body portion 520. Accordingly, a lateral width of the end flap 530 is approximately the same size as the lateral gap between the side surfaces 544, 548. For the lateral ends 530b, 530c to "abut" the side surfaces 544, 548, the ends 530b, 530c and surfaces 544, 548 need not touch but should be close enough that only an insubstantial gap is formed between the ends 530b, 530c and surfaces 544, 548 and water escaping through the gap does not substantially affect the functionality of the venturi 500. Because the end flap 530 substantially abuts the surfaces 544, 548 through its pivotal range, the overall interior surface of the venturi 500 is generally continuous, even if the 90 degree angles between the movable portion and the sides 520b, 520c prevent the interior surface from being completely smooth. The continuous surface helps to ensure that water flows smoothly through the venturi 500 and excessive leakage or turbulence does not occur. The continuous surface provides a substantial improvement over conventional variable venturis that include pivoting members that do not substantially abut adjacent venturi portions.

Rearward interior ends of the body portion 520 and end flap 530 combine to define a perimeter and cross-sectional shape of a discharge opening 560 of the venturi 500.

The discharge opening control mechanism 510 comprises an actuator like the actuators 290, 375 described above that extends between a rigid portion of the watercraft 10 such as the body portion 520 of the venturi 500 and a pivot arm formed on the end flap 530. The actuator 510 selectively moves the end flap 530 in a vertical direction relative to the body portion 520. FIG. 9 illustrates the venturi 500 and actuator 510 in a large-discharge-opening position, while FIG. 10 illustrates the venturi 500 and actuator 510 in a small-discharge-opening position. When the actuator 510 moves the end flap 530 upwardly, less of the side surfaces 544, 548 form part of the perimeter of the discharge opening 560 such that a perimeter and cross-sectional area of the discharge opening 560 shrinks. However, throughout the movable range of the end flap 530, the perimeter of the discharge opening remains continuous (i.e. there are not substantial gaps in the perimeter formed between the end flap 530 and the side surfaces 544, 548).

While the illustrated end flap 530 is disposed on the lower side of the venturi 500 and moves in a vertical direction, the end flap 530 could be positioned elsewhere on the venturi 500 and move in a different direction without deviating from the scope of the present invention. Furthermore, an additional movable portion could be added at the top side of the venturi 500 such that the discharge opening would be rectangular and selectively compress vertically from the top and bottom of the venturi.

For the purposes of this invention, the discharge opening is defined at the cross-section of the venturi that has the smallest internal area when the venturi is in its small-discharge-opening position (i.e., the minimum throat position). If a variable venturi were to open up rearwardly of the throat position, the discharge opening is defined at the throat, not at a rearward end of the venturi. Accordingly, while the minimum cross-sectional area portion of each of the preferred embodiments is disposed at the rearward edge of the venturis, the discharge opening need not be formed at the rearward edge of the venturi to fall within the scope of the present invention.

Although only the large- and small-discharge-opening positions of the embodiments of the variable venturis of the present invention have been described in detail, each of the variable venturis also preferably includes an infinite number of positions between the maximum and minimum area opening positions. Consequently, the venturi controller 22 can fine tune the discharge opening size to balance the various operating parameters controlled by the size of the discharge opening.

Although the above description contains specific examples of the present invention, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A jet propulsion system for a watercraft comprising:
   an impeller;
   a pump housing enclosing the impeller;
   a venturi coupled to the pump housing and having a flexible portion that has a discharge opening with a cross-sectional shape and an area;
   at least one movable member associated with the flexible portion; and
   an actuator coupled to the at least one movable member that selectively moves the at least one movable member to flex the flexible portion and alter the cross-sectional shape and the area of the discharge opening;
   wherein the actuator causes the at least one movable member to selectively flex the flexible portion between first and second positions, and wherein the area of the discharge opening is larger in the first position than in the second position, and
   wherein the cross-sectional shape of the discharge opening is substantially circular in the first position and substantially oval in the second position.

2. The jet propulsion system of claim 1, wherein the discharge opening has a perimeter with a fixed length.

3. The jet propulsion system of claim 1, wherein the at least one movable member comprises first and second members connected to opposite sides, respectively, of the flexible portion, and
   wherein the first and second members move toward each other to move the flexible portion from the first position to the second position.

4. The jet propulsion system of claim 1 in combination with a watercraft comprising:
   a hull supporting the jet propulsion system; and
   an engine supported by the hull and operatively connected to the jet propulsion system.

5. The combination of claim 4, wherein the jet propulsion system further comprises a venturi controller operatively connected to the actuator, and wherein the venturi controller selectively controls the actuator to automatically move the at least one movable member in response to at least one watercraft parameter.

6. A jet propulsion system for a watercraft comprising:
   an impeller;
   a pump housing enclosing the impeller;
   a venturi coupled to the pump housing and having a rearward discharge opening and at least one additional discharge passage permitting fluid communication between an inside of the venturi and an ambient environment;
   a valve disposed in the at least one additional discharge passage; and
   an actuator connected to the at least one valve to selectively regulate fluid flow through the at least one additional discharge passage.

7. The jet propulsion system of claim 6, wherein the at least one additional discharge passage comprises a hole in a peripheral portion of the venturi, the hole being disposed forwardly from the rearward discharge opening.

8. The jet propulsion system of claim 7, wherein the at least one additional discharge passage further comprises a tube connected to the hole and extending rearwardly from the hole, wherein the valve is operatively connected to the tube.

9. The jet propulsion system of claim 6, wherein the at least one additional discharge passage comprises a plurality of discharge passages that are circumferentially spaced from each other around a perimeter of the venturi.

10. The jet propulsion system of claim 6 in combination with a watercraft comprising:
    a hull supporting the jet propulsion system; and
    an engine supported by the hull and operatively connected to the jet propulsion system.

11. The combination of claim 10, wherein the jet propulsion system further comprises a venturi controller operatively connected to the actuator, and wherein the venturi controller selectively controls the actuator to automatically control the valve.

12. A jet propulsion system for a watercraft comprising:
    an impeller;
    a pump housing enclosing the impeller;

a venturi coupled to the pump housing and having a flexible, tubular portion that defines a discharge opening;

a collar mounted to the flexible, tubular portion; and an actuator connected to the collar, wherein the actuator selectively tightens the collar to squeeze the flexible, tubular portion radially inwardly and reduce a cross-sectional area of the discharge opening.

13. The jet propulsion system of claim 12, wherein the flexible, tubular portion comprises a plurality of rearwardly-extending, flexible, circumferentially-spaced venturi sections.

14. The jet propulsion system of claim 13, wherein circumferentially-adjacent venturi sections overlap each other such that a circumferential end of each section is disposed radially-inwardly from an adjacent circumferential end of an adjacent section.

15. The jet propulsion system of claim 12, further comprising a pump housing disposed around the impeller, and wherein a forward end of the flexible, tubular portion is rigidly mounted to a rearward end of the pump housing.

16. The jet propulsion system of claim 12, wherein the collar comprises an arc-shaped strip having first and second ends, and the actuator comprises a tightening mechanism connected between the first and second ends, wherein the tightening mechanism selectively moves the first and second ends with respect to each other to change an inner diameter of the arc-shaped strip.

17. The jet propulsion system of claim 12, in combination with a watercraft comprising:

a hull supporting the jet propulsion system; and an engine supported by the hull and operatively connected to the jet propulsion system.

18. The combination of claim 17, wherein the jet propulsion system further comprises a venturi controller operatively connected to the actuator, and wherein the venturi controller selectively controls the actuator to automatically tighten the collar.

19. A jet propulsion system for a watercraft comprising:

an impeller;

a pump housing enclosing the impeller;

a venturi coupled to the pump housing, the venturi comprising a body portion having first and second planar interior surfaces spaced in a generally parallel relationship, and an end flap coupled to the body portion and movable between first and second positions relative to the body portion, the end flap being disposed between the first and second interior surfaces, the end flap having side walls that substantially abut the first and second interior surfaces when the end flap is in the first and second positions, wherein the body portion and the end flap each have rearward edges that define a discharge opening; and an actuator connected to the end flap, wherein the actuator moves the end flap relative to the body portion between the first and second positions, a cross-sectional area of the discharge opening being larger when the end flap is in the first position than in the second position.

20. The watercraft of claim 19, wherein the end flap is substantially planar adjacent the rearward edge.

21. The watercraft of claim 19, wherein the end flap is pivotally connected to the body portion at a pivotal axis that is perpendicular to the interior surfaces.

22. The watercraft of claim 19, wherein the discharge opening has a continuous perimeter regardless of whether the end flap is in the first or second position.

23. The jet propulsion system of claim 19 in combination with a watercraft comprising:

a hull supporting the jet propulsion system; and an engine supported by the hull and operatively connected to the jet propulsion system.

24. The combination of claim 23, wherein the jet propulsion system further comprises a venturi controller operatively connected to the actuator, and wherein the venturi controller selectively controls the actuator to automatically move the end flap.

\* \* \* \* \*